United States Patent
Tang et al.

(10) Patent No.: US 11,252,761 B2
(45) Date of Patent: Feb. 15, 2022

(54) METHOD AND APPARATUS FOR RANDOM ACCESS

(71) Applicant: Guangdong OPPO Mobile Telecommunications Corp., Ltd., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 196 days.

(21) Appl. No.: 16/471,438

(22) PCT Filed: Dec. 26, 2016

(86) PCT No.: PCT/CN2016/112210
§ 371 (c)(1),
(2) Date: Jun. 19, 2019

(87) PCT Pub. No.: WO2018/119612
PCT Pub. Date: Jul. 5, 2018

(65) Prior Publication Data
US 2021/0136822 A1    May 6, 2021

(51) Int. Cl.
*H04W 4/00* (2018.01)
*H04W 74/08* (2009.01)
(Continued)

(52) U.S. Cl.
CPC ..... *H04W 74/0833* (2013.01); *H04W 72/042* (2013.01); *H04W 72/046* (2013.01);
(Continued)

(58) Field of Classification Search
None
See application file for complete search history.

(56) References Cited

U.S. PATENT DOCUMENTS

2015/0085689 A1* 3/2015 Vos .......................... H04W 4/18
370/252
2015/0305014 A1* 10/2015 Li ......................... H04W 72/048
370/330
(Continued)

FOREIGN PATENT DOCUMENTS

| CN | 103945557 A | 7/2014 |
| CN | 105764152 A | 7/2016 |

(Continued)

OTHER PUBLICATIONS

Third China Office Action with English Translation for CN 201680091332.2 dated Nov. 30, 2020.
(Continued)

*Primary Examiner* — Clemence S Han
(74) *Attorney, Agent, or Firm* — Young Basile Hanlon & MacFarlane, P.C.

(57) ABSTRACT

A method and an apparatus for random access are provided. The method includes: a network device receives a plurality of random access signals on a plurality of predetermined resources, wherein one predetermined resource of the plurality of predetermined resources corresponds to one random access signal of the plurality of random access signals; the network device determines a radio network temporary identifier (RNTI) according to the plurality of predetermined resources; and the network device transmits a random access response of the plurality of random access signals scrambled through the RNTI.

26 Claims, 4 Drawing Sheets

(51) Int. Cl.
   *H04W 76/27* (2018.01)
   *H04W 72/04* (2009.01)
   *H04W 74/00* (2009.01)
(52) U.S. Cl.
   CPC ..... *H04W 72/0466* (2013.01); *H04W 74/006* (2013.01); *H04W 76/27* (2018.02)

(56) References Cited

U.S. PATENT DOCUMENTS

| | | | |
|---|---|---|---|
| 2016/0295609 | A1 | 10/2016 | Vajapeyam et al. |
| 2018/0007590 | A1* | 1/2018 | Karout ............... H04W 36/0055 |
| 2019/0174554 | A1* | 6/2019 | Deenoo ............... H04W 56/001 |
| 2020/0213040 | A1* | 7/2020 | Takeda ............... H04W 4/70 |
| 2020/0314908 | A1* | 10/2020 | Hwang ............. H04W 74/0833 |

FOREIGN PATENT DOCUMENTS

| | | | |
|---|---|---|---|
| CN | 106162840 | A | 11/2016 |
| JP | 2016511955 | A | 4/2016 |
| JP | 2016534662 | A | 11/2016 |
| WO | 2014104758 | A1 | 7/2014 |

OTHER PUBLICATIONS

Forth China Office Action with English Translation for CN 201680091332.2 dated Nov. 30, 2020.
English translation of China First Office for CN application No. 201680091332.2 dated May 20, 2020.
English translation of China Second Office for CN application No. 201680091332.2 dated Aug. 4, 2020.
3 GPP TSG RAN WG1 Meeting #83; R1156685; Anaheim, USA, Nov. 15-22, 2015.
3 GPP TSG RAN WG1 Meeting #87; R11611462; Reno, USA, Nov. 14-18, 2016.
3 GPP TSG RAN WG1 Meeting #87; R11612466; Reno, USA, Nov. 14-18, 2016.
EP Extended Search Report for EP 16925643.5 dated Nov. 18, 2019.
3GPP TSG-RAN WG2 Meeting #93 St. Julian's, Malta, Feb. 15-19, 2016 R2-161391.
India First Examination Report for IN Application 201917028799 dated Jan. 27, 2021.
Japan First Office Action with English Translation for JP Application 2019533139 dated Dec. 18, 2020.
3 GPP TSG RAN WG2 #96; Reno, USA, Nov. 14-18, 2016; R2167568.
3GPP TSG RAN WG1 Meeting #81; Fukuoka, Japan, May 25-29, 2015; R1-153326.
Taiwan Examination Report with English Translation for TW Application 106142931 dated Jun. 17, 2021. (33 pages).

* cited by examiner

200

A network device receives a plurality of random access signals on a plurality of predetermined resources, wherein one predetermined resource of the plurality of predetermined resources corresponds to one random access signal of the plurality of random access signals ~ S210

The network device determines a radio network temporary identifier (RNTI) according to the plurality of predetermined resources ~ S220

The network device transmits a random access response of the plurality of random access signals scrambled through the RNTI ~ S230

FIG. 2

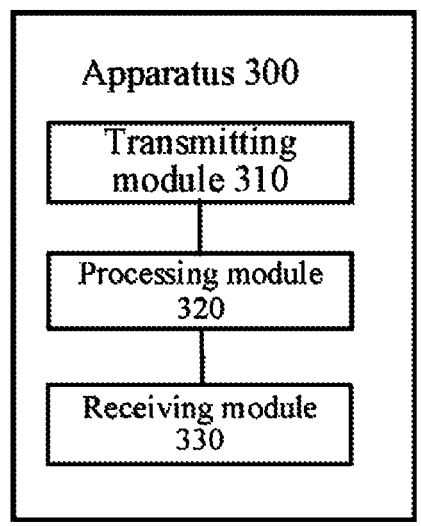

FIG. 3

METHOD AND APPARATUS FOR RANDOM ACCESS

CROSS-REFERENCE TO RELATED APPLICATION(S)

This application is a 371 application of International Application No. PCT/CN2016/112210, filed on Dec. 26, 2016 the entire disclosure of which is hereby incorporated by reference.

TECHNICAL FIELD

Implementations of the present disclosure relate to the communication field, in particular to a method and an apparatus for random access in the communication field.

BACKGROUND

In a future network system, different beams correspond to different directions and different coverage areas. During random access of a terminal device to a network, the terminal device needs to transmit random access signals to a network device. If the network device receives multiple random access signals, the network device will respond by multiple random access responses, but the multiple random access responses correspond to multiple network temporary identifiers. If the multiple random access responses are of one terminal device, then the terminal device cannot detect the random access responses, thus it is difficult to establish a communication link between the terminal device and the network device, resulting in that the terminal device and the network device cannot carry out a normal communication.

SUMMARY

The method and the apparatus for random access are provided by the implementations of the present disclosure.

In a first aspect, there is provided a method for random access, the method including: a network device receives a plurality of random access signals on a plurality of predetermined resources, wherein one predetermined resource of the plurality of predetermined resources corresponds to one random access signal of the plurality of random access signals; the network device determines a radio network temporary identifier (RNTI) according to the plurality of predetermined resources; and the network device transmits a random access response of the plurality of random access signals scrambled through the RNTI.

In the implementation of the present disclosure, when a network device receives a plurality of random access signals on a plurality of predetermined resources, the network device returns one random access response for the plurality of random access signals, and performs scrambling through RNTI identifiers determined by the plurality of predetermined resources, so that when a terminal device receives the random access response, the terminal device detects the random access response according to the RNTI, and determines that the random access response is transmitted by the network device to the terminal device.

Optionally, the plurality of random access signals received by the network device may be a plurality of random access signals, transmitted by one terminal device, received by the network device, and transmitting of the plurality of random access signals by the terminal device to the network device may be successively transmitting of the plurality of random access signals by the terminal device to the network device, wherein the successively transmitting here represents transmitting the random access signals when the random access response is not received, that is, the implementation of the present disclosure does not limit whether the successively transmitting is continuous on resources, transmitting a plurality of random access signals at intervals of specific time-frequency resources when the random access response is not received may also be called successively transmitting the plurality of random access signals. That is, the implementation of the present disclosure does not limit whether the successively transmitting is continuous on a specific resource.

Optionally, the plurality of predetermined resources may be specified by a protocol between the network device and the terminal device or configured by the network, i.e., the plurality of random access signals received on the plurality of predetermined resources have a common random access response, and the network device and the terminal device may specify by a protocol to determine one RNTI through the plurality of predetermined resources, and thus as long as a plurality of random access signals are received on the plurality of predetermined resources, the received plurality of random access signals are considered as possibly coming from one terminal device, and the random access response is scrambled through the determined RNTI. Thus, when the terminal device may determine the RNTI by using the method of determining the RNTI specified in the protocol, the terminal device detects the random access response through the determined RNTI, and when the terminal device successfully detects the random access response, the random access is considered successful, and a communication link with the network device may be established.

Optionally, the network device may receive the plurality of random access signals through a plurality of beams, that is, the network device may receive the plurality of random access signals at one time; or the network device may receive the plurality of random access signals through one beam, that is, the network device may receive the plurality of random access signals multiple times.

Optionally, the plurality of random access signals may be identical random access signals, for example, beams transmitting the random access signals are identical, and the same encoding manner is used for the plurality of random access signals; or, the plurality of random access signals may be different random access signals, for example, different beams that transmit multiple random access signals may be referred to as different random access signals, and different encoding manners of the plurality of random access signals may be referred to as different random access signals. The implementations of the present disclosure are not limited to this.

Optionally, each predetermined resource in the plurality of predetermined resources may include at least one of a sequence, a time domain resource, and a frequency domain resource.

In some implementations, before the network device transmits the random access response of the plurality of random access signals scrambled through the RNTI, the method further includes that: the network device determines that the random access response of the plurality of random access signals is scrambled through the RNTI.

In the implementation of the present disclosure, the plurality of predetermined resources may be predefined resources, and only one random access response needs to be returned for the plurality of random access signals as long as the plurality of random access signals are transmitted on the plurality of predetermined resources, so that the network device may determine one RNTI according to the plurality of predetermined resources as long as the plurality of random access signals are received on the plurality of predetermined resources. Thus, the network device may determine that the random access response of the plurality of random access signals received on the plurality of predetermined resources may be scrambled by RNTI. When the plurality of random access signals received by the network device are not received on the plurality of predetermined resources by the network device, for example, the network device may have received a first part of the plurality of random access signals on a plurality of first predetermined resources and received a remaining second part of the plurality of random access signals on a plurality of second predetermined resources, the network device needs to return a random access response for the first part of the random access signals, and return a random access response for the second part of the random access signals, and the network device needs to determine a first RNTI according to the plurality of first predetermined resources, scramble the random access response of the first part of the random access signals through the first RNTI, determine a second RNTI according to the plurality of second predetermined resources, and scramble the random access response of the second part of the random access signals through the second RNTI.

In some implementations, the network device determines the radio network temporary identifier (RNTI) according to the plurality of predetermined resources, including that: the network device determines the RNTI according to a first predetermined resource of the plurality of predetermined resources.

In the implementation of the present disclosure, a network device and a terminal device may negotiate in advance to determine to calculate a RNTI through a specific predetermined resource in a first predetermined resource set. When the network device receives a plurality of random access signals on a plurality of predetermined resources, the network device may determine that the plurality of predetermined resources belong to the first predetermined resource set, so the network device may calculate the RNTI according to the specific predetermined resource in the first predetermined resource set. That is, there is a mapping relationship between the specific predetermined resource and the RNTI. The specific predetermined resource may be one of the plurality of predetermined resources or may not be a predetermined resource of the plurality of predetermined resources. When the specific predetermined resource is not a predetermined resource of the plurality of predetermined resources, and when the network device determines that the plurality of predetermined resources belong to the first predetermined resource set, the specific predetermined resource of the first predetermined resource set may be inferred, and then the RNTI may be determined according to the mapping relationship between the specific predetermined resource and the RNTI.

In some implementations, before the network device receives a plurality of random access signals on a plurality of predetermined resources, the method further includes that: the network device transmits first indication information, wherein the first indication information is used for indicating a plurality of predetermined resource sets, and a plurality of random access signals transmitted on a plurality of predetermined resources of each predetermined resource set in the plurality of predetermined resource sets correspond to one random access response, and the plurality of predetermined resource sets include a first predetermined resource set, and the first predetermined resource set includes the plurality of predetermined resources; wherein the network device receives the plurality of random access signals on the plurality of predetermined resources, including that: the network device receives the plurality of random access signals on the plurality of predetermined resources included in the first predetermined resource set.

In the implementation of the present disclosure, the network device may indicate a plurality of predetermined resource sets through first indication information, of course, the plurality of predetermined resource sets may be a plurality of predetermined resource sets specified by a protocol, and both a network device and a terminal device may obtain the plurality of predetermined resource sets according to the protocol. Elements in each predetermined resource set of the plurality of predetermined resource sets correspond to one random access response, that is, the elements in each predetermined resource set correspond to one RNTI, so that a predetermined resource set may be guaranteed to correspond to one random access response and one RNTI, and a unique RNTI may be allocated to a terminal device. It should be understood that a plurality of predetermined resources of each predetermined resource set in the plurality of predetermined resource sets refers to a quantity of predetermined resources, that is, each predetermined resource set includes a plurality of predetermined resources, and the quantity of predetermined resources in each predetermined resource set may be the same or different, and the quantity of predetermined resources included in the first predetermined resource set may be the plurality of predetermined resources mentioned in the first aspect.

In some implementations, the network device transmits the random access response scrambled through the RNTI, including that: after the network device receives the plurality of random access signals on all predetermined resources included in the first predetermined resource set, the network device transmits the random access response scrambled through the RNTI, and the all predetermined resources include the plurality of predetermined resources.

In the implementation of the present disclosure, a network device may detect all predetermined resources in a first predetermined resource set, and after receiving a plurality of random access signals on all the predetermined resources, the network device transmits random access response of the plurality of random access signals, that is, a quantity of predetermined resources included in the first predetermined resource set is equal to a quantity of the plurality of random access signals; or, the network device may return one random access response scrambled by one RNTI for at least two random access signals received on at least two predetermined resources without detecting remaining predetermined resources as long as the network device receives the at least two random access signals on the at least two predetermined resources in the first predetermined resource set, that is, the at least two predetermined resources here may be the plurality of predetermined resources, and the at least two random access signals may be the plurality of random access signals.

In some implementations, the first indication information is specifically used for indicating a second predetermined resource and a resource offset in each predetermined resource set of the plurality of predetermined resource sets. For example, the second predetermined resource may be a first predetermined resource in each predetermined resource set.

In some implementations, the resource offset includes at least one of an offset of a root sequence number, an offset of a frequency domain resource, an offset of a time domain resource, and an offset of a cyclic shift of a sequence.

In some implementations, the network device receives the plurality of random access signals transmitted on the plurality of predetermined resources, including that: the network device receives, on the plurality of predetermined resources through a plurality of beams, the plurality of random access signals transmitted on the plurality of predetermined resources through a first beam.

In the implementation of the present disclosure, a network device may receive, through a plurality of beams, a plurality of random access signals transmitted through a first beam, so that the network device may detect which beam of a plurality of beams receives the random access signal with better quality, for example, a beam corresponding to a random access signal with the best energy may be determined as the best receiving beam by comparing energies of the received plurality of random access signals. Here, a quantity of beams of the plurality of beams may be less than or equal to a quantity of random access signals of the plurality of random access signals. For example, when the quantity of beams is equal to the quantity of random access signals, one random access signal may be received on one beam. When the quantity of beams is less than the quantity of random access signals, at least two random access signals may be received on one beam. For example, when at least two random access signals are received on a specific beam, an average energy of the at least two random access signals may be determined as a receiving capability of the specific beam, or the highest energy of a random access signal of the at least two random access signals may be determined as the receiving capability of the specific beam.

In some implementations, the network device receives the plurality of random access signals transmitted on the plurality of predetermined resources, including that: the network device receives, on the plurality of predetermined resources through a second beam, the plurality of random access signals sequentially and successively transmitted through a plurality of beams, and a quantity of beams of the plurality of beams is less than or equal to a quantity of random access signals of the plurality of random access signals.

In the implementation of the present disclosure, a network device may receive through one beam a plurality of random access signals transmitted by a terminal device through a plurality of beams, so that the network device may determine the best or better transmission beam of the terminal device according to energies of the received plurality of random access signals. For example, when a quantity of beams is equal to a quantity of random access signals, one random access signal may be transmitted on one beam, and when the quantity of beams is less than the quantity of random access signals, at least two random access signals may be transmitted on one beam, for example, when at least two random access signals are transmitted on a specific beam, an average energy of the at least two random access signals may be determined as a receiving capability of the specific beam, or the highest energy of a random access signal of the at least two random access signals may be determined as the receiving capability of the specific beam.

In some implementations, after the network device receives, on the plurality of predetermined resources through a second beam, the plurality of random access signals sequentially transmitted through the plurality of beams, the method further includes that: the network device determines a third beam among the plurality of beams according to signal energies of the plurality of random access signals, and the third beam is used for the terminal device to transmit data; wherein the random access response includes second indication information, and the second indication information is used for indicating that the terminal device uses the third beam to transmit data.

In the implementation of the present disclosure, a network device may carry the optimal or better beam determined according to energies of random access signals into a random access response in a manner indicated by second indication information, for example, a third beam. When a terminal device detects the random access response, the terminal device may determine the optimal or better transmission beam according to the second indication information in the random access response, and transmit data through the optimal or better beam. Specifically, the second indication information is used for instructing a terminal device, which transmits a plurality of random access signals to a network device, to transmit data through a third beam.

In a second aspect, there is provided a method for random access, the method including that: a terminal device transmits a plurality of random access signals to a network device on a plurality of predetermined resources, wherein one predetermined resource of the plurality of predetermined resources corresponds to one random access signal of the plurality of random access signals; the terminal device determines a radio network temporary identifier (RNTI) according to the plurality of predetermined resources; the terminal device receives a random access response of the plurality of random access signals transmitted by the network device; and the terminal device detects the random access response through the RNTI.

In the implementation of the present disclosure, a terminal device may transmit a plurality of random access signals to a network device on a plurality of predetermined resources, and the plurality of predetermined resources may be a plurality of predetermined resources specified by a protocol or a plurality of predetermined resources configured by a network. After the terminal device determines the plurality of predetermined resources, the terminal device may determine its own RNTI according to the predetermined resources, and when the terminal device receives the random access response transmitted by the network device, the terminal device may detect the random access response through its own RNTI. How to determine the RNTI according to a plurality of predetermined resources may be specified in a protocol, which may enable the terminal device to normally access the network and further establish a communication link with the network device.

Optionally, transmitting, by a terminal device, a plurality of random access signals to a network device on a plurality of predetermined resources, may be successively transmitting, by the terminal device, the plurality of random access signals to the network device, and the successively transmitting here represents transmitting the random access signals when the random access response is not received, that is, the implementation of the present disclosure does not limit whether the successively transmitting is continuous on resources, transmitting a plurality of random access signals at intervals of specific time-frequency resources when the random access response is not received may also be called successively transmitting the plurality of random access signals. That is, the implementation of the present disclosure does not limit whether the successively transmitting is continuous on a specific resource. Of course, the terminal device may simultaneously transmit a plurality of random access signals through a plurality of beams.

In the implementation of the present disclosure, before the terminal device transmits the plurality of random access signals to the network devices on the plurality of predetermined resources, the method includes that: the terminal device determines the plurality of predetermined resources.

In the implementation of the present disclosure, the plurality of predetermined resources may be indicated to the terminal device by the network device or may be specified by a protocol, and the implementation of the present disclosure is not limited to this.

In some implementations, the terminal device determines the plurality of predetermined resources, including that: the terminal device receives first indication information transmitted by a network device, and the first indication information is used for indicating a plurality of predetermined resource sets, and a plurality of random access signals transmitted on a plurality of predetermined resources of each predetermined resource set in the plurality of predetermined resource sets correspond to one random access response; the terminal device determines a first predetermined resource set among the plurality of predetermined resource sets indicated by the first indication information; and the terminal device determines the plurality of predetermined resources in the first predetermined resource set.

In the implementation of the present disclosure, a terminal device may receive first indication information indicating a plurality of predetermined resource sets, and of course, the plurality of predetermined resource sets may be a plurality of predetermined resource sets specified by a protocol, and both a network device and the terminal device may obtain the plurality of predetermined resource sets according to the protocol. Elements in each predetermined resource set of the plurality of predetermined resource sets correspond to one random access response, that is, the elements in each predetermined resource set correspond to one RNTI, so that a predetermined resource set may be guaranteed to correspond to one random access response and one RNTI, and a unique RNTI may be determined for terminal device.

In some implementations, the first indication information is specifically used for indicating a second predetermined resource and a resource offset in each predetermined resource set of the plurality of predetermined resource sets, and the terminal device determines the plurality of predetermined resources, including that: the terminal device determines a second predetermined resource according to the first indication information; the terminal device determines remaining predetermined resources other than the second predetermined resource among the plurality of predetermined resources according to the second predetermined resource and the resource offset. For example, the second predetermined resource may be a first predetermined resource in each predetermined resource set.

In some implementations, the resource offset includes at least one of an offset of a root sequence number, an offset of a frequency domain resource, an offset of a time domain resource, and an offset of a cyclic shift of a sequence.

In some implementations, the terminal device determines the RNTI according to the plurality of predetermined resources, including that: the terminal device determines the RNTI according to a first predetermined resource among the plurality of predetermined resources.

In the implementation of the present disclosure, a network device and a terminal device may negotiate in advance to determine to calculate a RNTI through a specific predetermined resource in a first predetermined resource set. When the terminal device transmits a plurality of random access signals on a plurality of predetermined resources, the terminal device may determine that the plurality of predetermined resources belong to the first predetermined resource set, so the terminal device may calculate the RNTI according to a specific predetermined resource in the first predetermined resource set. That is, there is a mapping relationship between the specific predetermined resource and the RNTI. The specific predetermined resource may be one of the plurality of predetermined resources or may not be a predetermined resource of the plurality of predetermined resources. When the specific predetermined resource is not a predetermined resources of the plurality of predetermined resources, and when the terminal device determines that the plurality of predetermined resources belong to the first predetermined resource set, the specific predetermined resource of the first predetermined resource set may be inferred, and then the RNTI may be determined according to the mapping relationship between the specific predetermined resource and the RNTI.

In some implementations, the terminal device transmits the plurality of random access signals to the network device on the plurality of predetermined resources, including that: the terminal device successively transmits the plurality of random access signals to the network device on the plurality of predetermined resources through a first beam.

In the implementation of the present disclosure, a terminal device transmits the plurality of random access signals through a first beam, and a network device may receive the plurality of random access signals through one beam or a plurality of beams, and when the network device receives the plurality of random access signals through the plurality of beams, the network device may determine its own optimal or better beam according to the received plurality of random access signals.

In some implementations, the terminal device transmits the plurality of random access signals to the network device on the plurality of predetermined resources, including that: the terminal device transmits the plurality of random access signals to the network device on the plurality of predetermined resources through a plurality of beams, and a quantity of beams of the plurality of beams is less than or equal to a quantity of the plurality of random access signals.

In some implementations, the terminal device successively transmits the plurality of random access signals to the network device on the plurality of predetermined resources through the plurality of beams, including that: the terminal device sequentially and successively transmits the plurality of random access signals to the network device on the plurality of predetermined resources through the plurality of beams.

In some implementations, the random access response include second indication information which is used for instructing the terminal device to transmit data through a third beam among the plurality of beams; after the terminal device receives the random access response of the plurality of random access signals transmitted by the network device, the method further includes: the terminal device transmits data through the third beam indicated by the second indication information.

In the implementation of the present disclosure, a terminal device may transmit a plurality of random access signals on a plurality of predetermined resources through a plurality of beams, that is, the terminal device may transmit a plurality of random access signals on a plurality of predetermined resources simultaneously through a plurality of beams, and the network device may receive the random access signals on the plurality of predetermined resources through a plurality of beams. Of course, the terminal device may successively transmit a plurality of random access signals to the network device at one time on a plurality of beams, and the network device uses one beam to receive the plurality of random access signals transmitted by the terminal device at one time. Thus, the network device may determine the optimal or better beam for the terminal device to transmit the random access signals, and may indicate in a form of second indication information, and the second indication information may be carried in a random access response transmitted by the network device.

In some implementations, the terminal device receives the random access response of the plurality of random access signals transmitted by the network device, including that: the terminal device receives the random access response of the plurality of random access signals transmitted by the network device within at least one random access response window of the plurality of random access signals.

In an implementation of the present disclosure, a plurality of random access signals may have one or more random access response windows, and when the plurality of random access signals have one random access response window, the terminal device may start the random access response window after a specific time period, after transmitting the plurality of random access signals; when the plurality of random access signals have a plurality of random access response windows, for example, each random access signal corresponds to a random access response window, the terminal device may successively transmit the plurality of random access signals at one time, and the terminal device may start a random access response window corresponding to each random access signal at a specific time period, after the each random access signal is transmitted.

In some implementations, if any one random access response window of the at least one random access response window does not end and the terminal device receives the random access response transmitted by the network device, the terminal device stops transmitting a subsequent random access signal to the network device.

In some implementations, if a first random access response window of the at least one random access response window ends and the terminal device does not receive the random access response transmitted by the network device, the terminal device continues to transmit a subsequent random access signal to the network device; or, if every random access response window of the at least one random access response window ends and the terminal device does not receive the random access response transmitted by the network device, the terminal device continues to transmit a subsequent random access signal to the network device.

In a third aspect, an apparatus for random access is provided for performing the method in the first aspect or any possible implementation of the first aspect. Specifically, the apparatus includes units for performing the method in the first aspect or any possible implementation of the first aspect.

In a fourth aspect, an apparatus for random access is provided for performing the method in the second aspect or any possible implementation of the second aspect. Specifically, the apparatus includes units for performing the method in the second aspect or any possible implementation of the second aspect.

In a fifth aspect, there is provided a system for random access, including the apparatus in the third aspect or possible implementations thereof and the apparatus in the fourth aspect or possible implementations thereof.

In a sixth aspect, there is provided an apparatus for random access, which may include a transceiver and a processor, and the network device may perform the method in the first aspect or any optional implementation thereof.

In a seventh aspect, there is provided an apparatus for random access, which may include a transceiver and a processor, and the terminal device may perform the method in the second aspect or any optional implementation thereof.

In an eighth aspect, a computer readable medium is provided. The computer readable medium stores program codes executable by a network device, and the program codes include instructions for executing the method in the first aspect or various implementations of the first aspect.

In a ninth aspect, a computer readable medium is provided. The computer readable medium stores program codes executable by a terminal device, and the program codes include instructions for executing the method in the second aspect or various implementations of the second aspect.

BRIEF DESCRIPTION OF DRAWINGS

FIG. 2 is a schematic diagram of another method for random access according to an implementation of the present disclosure.

FIG. 3 is a schematic diagram of an apparatus for random access according to an implementation of the present disclosure.

DETAILED DESCRIPTION

It should be understood that the technical schemes of the implementations of the present disclosure may be applied to various communication systems, such as Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS) or Worldwide Interoperability for Microwave Access (WiMAX) communication system, and other communication systems that may emerge in future.

It should also be understood that in implementations of the present disclosure, a terminal device may be referred to as User Equipment (UE), terminal device, Mobile Station (MS), Mobile Terminal, or a terminal device in a future 5G network, etc. The terminal device may communicate with one or more core networks via a Radio Access Network (RAN). For example, a terminal may be a mobile phone (or referred to as "cellular" phone) or a computer with a mobile terminal, or the terminal may be a portable mobile apparatus, a pocket-sized mobile apparatus, a hand-held mobile apparatus, a built-in-computer mobile apparatus, or a vehicle-mounted mobile apparatus, which exchanges voice and/or data with a wireless access network.

A network device may be used to communicate with a mobile device. The network device may be a Base Transceiver Station (BTS) in a Global System of Mobile Communication (GSM) or Code Division Multiple Access (CDMA), a NodeB (NB) in Wideband Code Division Multiple Access (WCDMA), an Evolution Node B (eNB or eNodeB) in LTE, a relay, an access point, a vehicle-mounted device, a wearable device, or an access network device in a future 5G network.

In an implementation of the present disclosure, a random access signal that a terminal device may transmit to a network device may be preamble, for example, the random access signal may be transmitted on a Physical Random Access Channel (PRACH). After the network device receives the random access signal transmitted by the terminal device, the network device may transmit a Random Access Response (RAR) to the terminal device, which is used for notifying the terminal device that it has successfully accessed.

Figure 1:
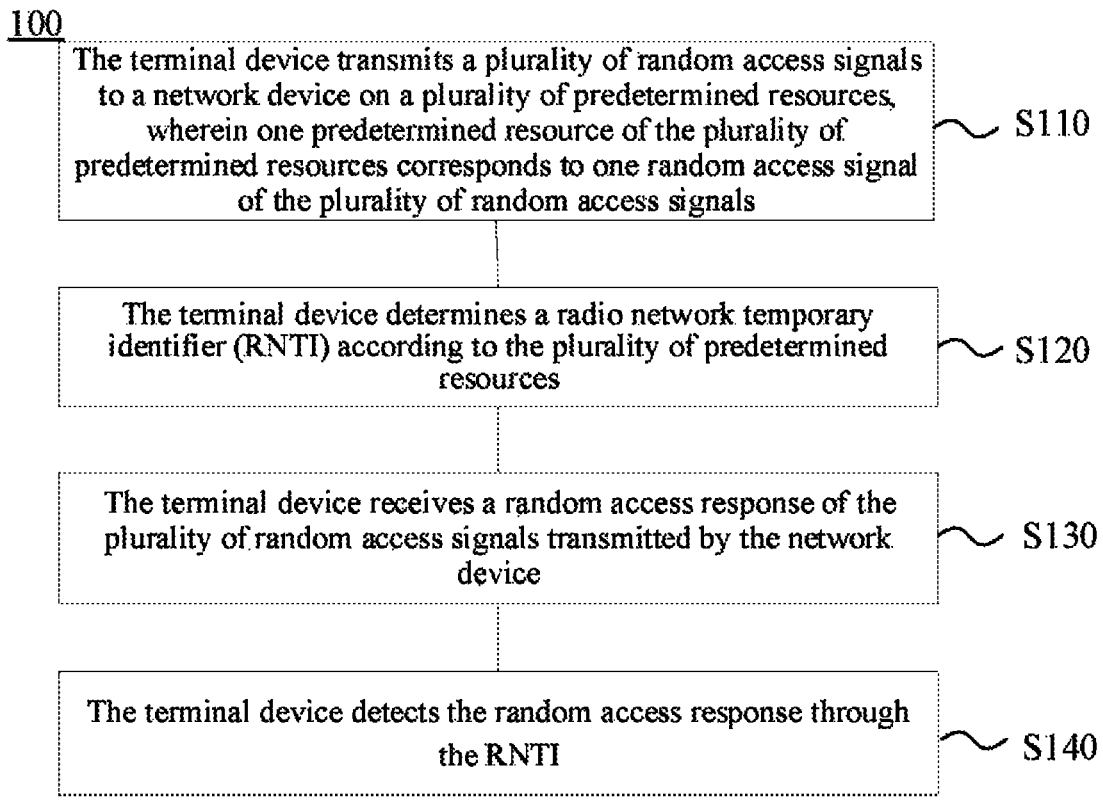
FIG. 1 is a schematic diagram of a method for random access according to an implementation of the present disclosure.

FIG. 1 shows a schematic flow chart of a method 100 for random access according to an implementation of the present disclosure. FIG. 1 shows acts or operations of the method for random access provided by the implementation of the present disclosure, but these acts or operations are merely examples, and other operations or variations of the operations shown in FIG. 1 may be performed in the implementation of the present disclosure. The method 100 includes acts S110-S140.

In S110, the terminal device transmits a plurality of random access signals to a network device on a plurality of predetermined resources, wherein one predetermined resource of the plurality of predetermined resources corresponds to one random access signal of the plurality of random access signals.

As an optional implementation, before S110, the method 100 includes: the terminal device determines the plurality of predetermined resources. The plurality of predetermined resources may be indicated to the terminal device by the network device or may be specified by a protocol, and the implementation of the present disclosure is not limited to this.

In S120, the terminal device determines a radio network temporary identifier (RNTI) according to the plurality of predetermined resources.

In S130, the terminal device receives a random access response of the plurality of random access signals transmitted by the network device.

It should be understood that the reception of random access response by the terminal device may be reception through blind detection. When the random access response is detected, a RNTI is used for detection.

In S140, the terminal device detects the random access response through the RNTI.

Therefore, a terminal device may transmit a plurality of random access signals to a network device on a plurality of predetermined resources, and the plurality of predetermined resources may be a plurality of predetermined resources specified by a protocol or a plurality of predetermined resources configured by a network. After the terminal device determines the plurality of predetermined resources, the terminal device may determine its own RNTI according to the predetermined resources, and when the terminal device receives a random access response transmitted by the network device, the terminal device may detect the random access response through its own RNTI. How to determine the RNTI according to a plurality of predetermined resources may be specified in a protocol, which may enable the terminal device to normally access the network and further establish a communication link with the network device, thus avoiding a problem that when the terminal device transmits a plurality of random access signals, and when the network device receives the plurality of random access signals, the network device may return a plurality of random access responses and each random access response will be scrambled by a different RNTI, then the terminal device does not know which random access response is transmitted to itself by the network device and cannot access the network.

FIG. 2 shows a schematic flow chart of a method 200 for random access according to an implementation of the present disclosure. FIG. 2 shows acts or operations of the method for random access provided by the implementation of the present disclosure, but these acts or operations are merely examples, and other operations or variations of the operations shown in FIG. 2 may be performed in the implementation of the present disclosure. The method 200 includes acts S210-S230.

In S210, a network device receives a plurality of random access signals on a plurality of predetermined resources, wherein one predetermined resource of the plurality of predetermined resources corresponds to one random access signal of the plurality of random access signals.

It should be understood that a network device may receive a plurality of random access signals on a plurality of predetermined resources by blind detection.

As an optional implementation, before S210, the method 200 further includes: the network device determines that a random access response of the plurality of random access signals is scrambled by the RNTI.

Specifically, the plurality of predetermined resources may be predefined resources, and only one random access response needs to be returned for the plurality of random access signals as long as the plurality of random access signals are transmitted on the plurality of predetermined resources, so that the network device may determine one RNTI according to the plurality of predetermined resources as long as the plurality of random access signals are received on the plurality of predetermined resources. Thus, the network device may determine that the random access response of the plurality of random access signals received on the plurality of predetermined resources may be scrambled by RNTI. When the plurality of random access signals received by the network device are not received on the plurality of predetermined resources by the network device, for example, the network device may have received a first part of the plurality of random access signals on a plurality of first predetermined resources and received the remaining second part of the plurality of random access signals on a plurality of second predetermined resources, the network device needs to return a random access response for the first part of the random access signals, and return a random access response for the second part of the random access signals, and the network device needs to determine a first RNTI according to the plurality of first predetermined resources, scramble the random access response of the first part of the random access signals through the first RNTI, determine a second RNTI according to the plurality of second predetermined resources, and scramble the random access response of the second part of the random access signals through the second RNTI.

In S220, the network device determines a radio network temporary identifier (RNTI) according to the plurality of predetermined resources.

In S230, the network device transmits a random access response of the plurality of random access signals scrambled through the RNTI.

As an optional implementation, the act S230 includes: after the network device receives the plurality of random access signals on all predetermined resources included in a first predetermined resource set, the network device transmits a random access response scrambled through the RNTI, and the all predetermined resources include the plurality of predetermined resources.

Specifically, a network device may detect all predetermined resources in a first predetermined resource set, and after receiving a plurality of random access signals on all the predetermined resources, the network device transmits a random access response of the plurality of random access signals, that is, a quantity of predetermined resources included in the first predetermined resource set is equal to a quantity of the plurality of random access signals; or, the network device may return one random access response scrambled by one RNTI for at least two random access signals received on at least two predetermined resources without detecting remaining predetermined resources as long as the network device receives the at least two random access signals on the at least two predetermined resources in the first predetermined resource set, that is, the at least two predetermined resources here may be the plurality of predetermined resources, the at least two random access signals may be the plurality of random access signals, thus avoiding that the network device needs to complete detection for all predetermined resources in a first resource predetermined set before transmitting a random access response, and time delay of random access may be reduced.

Therefore, when a network device receives a plurality of random access signals on a plurality of predetermined resources, the network device returns one random access response for the plurality of random access signals, and performs scrambling through RNTI identifiers determined by the plurality of predetermined resources, so that when a terminal device receives the random access response, the terminal device detects the random access response according to the RNTI, and determines that the random access response is transmitted by the network device to the terminal device. Thus, the terminal device may normally access a network, establish a communication link with the network device, and normal communication between the network device and the terminal device may be enabled.

It should be understood that in the implementation of the present disclosure, a RNTI may be a random access radio network temporary identifier (RN-RNTI).

As an optional implementation, the act S120 includes: the terminal device determines the RNTI according to a first predetermined resource among the plurality of predetermined resources. The act S220 includes: the network device determines the RNTI according to a first predetermined resource among the plurality of predetermined resources. The network device and the terminal device may negotiate in advance to determine to calculate the RNTI through a specific predetermined resource in a first predetermined resource set, that is, there is a mapping relationship between the specific predetermined resource and the RNTI, and the specific predetermined resource may be one of a plurality of predetermined resources. When a terminal device transmits a plurality of random access signals on a plurality of predetermined resources, the terminal device may determine that the plurality of predetermined resources belong to a first predetermined resource set, so the terminal device may calculate a RNTI according to a specific predetermined resource in the first predetermined resource set. When a network device receives a plurality of random access signals on a plurality of predetermined resources, the network device may determine that the plurality of predetermined resources belong to a first predetermined resource set, so the network device may calculate a RNTI according to a specific predetermined resource in the first predetermined resource set, and the specific predetermined resource may be one predetermined resource in the plurality of predetermined resources or may not be a predetermined resource in the plurality of predetermined resources. When the specific predetermined resource is not a predetermined resource in the plurality of predetermined resources, and when the network device and the terminal device determine that the plurality of predetermined resources belong to the first predetermined resource set, the specific predetermined resource of the first predetermined resource set may be inferred, and then the RNTI may be determined according to the mapping relationship between the specific predetermined resource and the RNTI.

As an optional implementation, before S210, the method 200 further includes: the network device transmits first indication information, and the first indication information is used for indicating a plurality of predetermined resource sets, and a plurality of random access signals transmitted on a plurality of predetermined resources of each predetermined resource set in the plurality of predetermined resource sets correspond to a random access response, and the plurality of predetermined resource sets include a first predetermined resource set, and the first predetermined resource set includes the plurality of predetermined resources; wherein the act S210 includes: the network device receives the plurality of random access signals on the plurality of predetermined resources included in the first predetermined resource set. The terminal device determines the plurality of predetermined resources, including: the terminal device receives first indication information transmitted by a network device, and the terminal device determines a first predetermined resource set among the plurality of predetermined resource sets indicated by the first indication information; and the terminal device determines the plurality of predetermined resources in the first predetermined resource set. For example, a network device may transmit first indication information to a plurality of terminal devices through broadcast, multicast or unicast, and the terminal device in the method 100 may be one terminal device of the plurality of terminal devices.

Specifically, the first indication information indicates a plurality of predetermined resource sets. Of course, the plurality of predetermined resource sets may be a plurality of predetermined resource sets specified by a protocol, and both a network device and a terminal device may obtain the plurality of predetermined resource sets according to the protocol. Elements in each predetermined resource set of the plurality of predetermined resource sets correspond to a random access response, that is, the elements in each predetermined resource set correspond to a RNTI, so that a predetermined resource set may be guaranteed to correspond to a random access response and a RNTI, and a unique RNTI may be determined for terminal device.

As an optional implementation, the first indication information is specifically used for indicating a second predetermined resource and a resource offset in each predetermined resource set of the plurality of predetermined resource sets.

The terminal device determines the plurality of predetermined resources, including: the terminal device determines a second predetermined resource according to the first indication information; the terminal device determines remaining predetermined resources other than the second predetermined resource among the plurality of predetermined resources according to the second predetermined resource and the resource offset.

As an optional implementation, the resource offset includes at least one of an offset of a root sequence number, an offset of a frequency domain resource, an offset of a time domain resource, and an offset of a cyclic shift of a sequence.

Specifically, a resource offset may be a resource offset of each predetermined resource in each predetermined resource set relative to a second predetermined resource, or it may be a common resource offset owned by all predetermined resources in each predetermined resource set. First indication information may indicate a resource (including an available sequence, a time domain resource, or a frequency domain resource) corresponding to $P\_1$ in a first predetermined resource set $[P\_1, P\_2, \ldots, P\_N]$ and an offset of subsequent $P\_2, \ldots, P\_N$ relative to $P\_1$. A terminal device may derive resources corresponding to $P\_2, \ldots, P\_N$ by combining the resource corresponding to $P\_1$ and the offset; of course, the offset may be the offset of $P\_2, \ldots, P\_N$ relative to $P\_1$, or an offset of each $P\_i$ ($i=2, \ldots, N$) relative to a previous $P\_(i-1)$.

As an optional implementation, the act S110 includes: the terminal device successively transmits the plurality of random access signals to the network device on the plurality of predetermined resources through a first beam. The act S210 includes: the network device receives, on the plurality of predetermined resources through a plurality of beams, the plurality of random access signals transmitted on the plurality of predetermined resources through a first beam, and a quantity of beams of the plurality of beams is less than or equal to a quantity of random access signals of the plurality of random access signals.

Specifically, the network device may receive, through a plurality of beams, a plurality of random access signals transmitted by a terminal device through a first beam, so that the network device may detect which beam of a plurality of beams receives the random access signal with better quality, for example, a beam corresponding to a random access signal with the best energy may be determined as the best receiving beam by comparing energies of the received plurality of random access signals. Here, a quantity of beams of the plurality of beams may be less than or equal to a quantity of random access signals of the plurality of random access signals. For example, when the quantity of beams is equal to the quantity of random access signals, one random access signal may be received on one beam. When the quantity of beams is less than the quantity of random access signals, at least two random access signals may be received on one beam. For example, when at least two random access signals are received on a specific beam, an average energy of the at least two random access signals may be determined as a receiving capability of the specific beam, or the highest energy of a random access signal of the at least two random access signals may be determined as the receiving capability of the specific beam.

As an optional implementation, the act S110 includes: the terminal device transmits the plurality of random access signals to the network device through a plurality of beams on the plurality of predetermined resources, and a quantity of beams of the plurality of beams is less than or equal to a quantity of random access signals of the plurality of random access signals. Optionally, the terminal device successively transmits the plurality of random access signals to the network device on the plurality of predetermined resources through the plurality of beams, including: the terminal device sequentially and successively transmits the plurality of random access signals to the network device on the plurality of predetermined resources through the plurality of beams. The act S210 includes: the network device receives, on the plurality of predetermined resources through a second beam, the plurality of random access signals sequentially and successively transmitted through a plurality of beams, and a quantity of beams of the plurality of beams is less than or equal to a quantity of random access signals of the plurality of random access signals.

Specifically, a network device may receive, through one beam, a plurality of random access signals transmitted by a terminal device through a plurality of beams, so that the network device may determine the best or better transmission beam of the terminal device according to energies of the received plurality of random access signals. For example, when the quantity of beams is equal to the quantity of random access signals, one random access signal may be transmitted on one beam, and when the quantity of beams is less than the quantity of random access signals, at least two random access signals may be transmitted on one beam, for example, when at least two random access signals are transmitted on a specific beam, an average energy of the at least two random access signals may be determined as a receiving capability of the specific beam, or the highest energy of a random access signal of the at least two random access signals may be determined as the receiving capability of the specific beam.

As an optional implementation, after the network device receives, on the plurality of predetermined resources through a second beam, the plurality of random access signals sequentially transmitted through the plurality of beams, the method 200 further includes: the network device determines a third beam among the plurality of beams according to signal energies of the plurality of random access signals, and the third beam is used for transmitting data. The random access response includes second indication information and the second indication information is used for instructing the terminal device to transmit data through a third beam among the plurality of beams. After the act S110, the method 100 further includes: the terminal device transmits data through the third beam indicated by the second indication information.

Specifically, a terminal device may transmit a plurality of random access signals on a plurality of predetermined resources through a plurality of beams, that is, the terminal device may transmit a plurality of random access signals on a plurality of predetermined resources simultaneously through a plurality of beams, and the network device may receive the random access signals on the plurality of predetermined resources through a plurality of beams. Of course, the terminal device may successively transmit a plurality of random access signals to the network device at one time on a plurality of beams, and the network device uses one beam to receive the plurality of random access signals transmitted by the terminal device at one time. Thus, the network device may determine the optimal or better beam for the terminal device to transmit the random access signals, and may indicate in a form of second indication information, and the second indication information may be carried in a random access response transmitted by the network device.

It should be understood that a terminal device may sequentially transmit a plurality of random access signals through one beam, or the terminal device may sequentially and successively transmit or simultaneously transmit a plurality of random access signals through a plurality of beams; a network device may receive a plurality of random access signals sequentially through one beam, or the network device may receive a plurality of random access signals sequentially or simultaneously through a plurality of beams. When the terminal device transmits through one beam and the network device receives through a plurality of beams, the network device may determine the optimal or better receiving beam according to energies of the received random access signals; when the terminal device transmits a plurality of random access signals through a plurality of beams and the network device receives through one beam, the network device may determine the optimal or better transmission beam of the terminal device, and may carry relevant information of the optimal or better transmission beam to be transmitted in a random access response.

As an optional implementation, the act S130 includes: the terminal device receives the random access response of the plurality of random access signals transmitted by the network device within at least one random access response window of the plurality of random access signals. A plurality of random access signals may have one or more random access response windows, and when the plurality of random access signals have one random access response window, the terminal device may start the random access response window after a specific time period, after transmitting the plurality of random access signals; when the plurality of random access signals have a plurality of random access response windows, for example, each random access signal corresponds to a random access response window, the terminal device may successively transmit the plurality of random access signals at one time, and the terminal device may start a random access response window corresponding to each random access signal at a specific time period, after the each random access signal is transmitted.

As an optional implementation, the method 100 further includes: if any one random access response window of the at least one random access response window does not end and the terminal device receives the random access response transmitted by the network device, the terminal device stops transmitting a subsequent random access signal to the network device.

Specifically, as long as a terminal device receives a random access response transmitted by a network device before any one random access response window does not end, the terminal device may stop transmitting a random access signal that has not been transmitted to the network device, that is, as long as the terminal device receives the random access response, it is considered that random access is successful, and no subsequent random access signal needs to be transmitted, thus, the signaling overhead may be saved. For example, the network device and the terminal device may stipulate by a protocol that ten random access signals are transmitted on ten predetermined resources. After the terminal device transmits five random access signals and detects a random access response in a random access response window, the terminal device may stop transmitting remaining five random access signals that have not yet been transmitted. Of course, in order to ensure the reliability of random access, the terminal device may choose not to stop transmitting subsequent random access signals that have not yet been transmitted.

As an optional implementation, the method 100 further includes: if a first random access response window of the at least one random access response window ends and the terminal device does not receive the random access response transmitted by the network device, the terminal device continues to transmit a subsequent random access signal to the network device; or, if every random access response window of the at least one random access response window ends and the terminal device does not receive the random access response transmitted by the network device, the terminal device continues to transmit a subsequent random access signal to the network device.

Specifically, a plurality of random access signals may have one or more random access response windows. When the plurality of random access signals have one random access response window, referred to as a first random access response window, a terminal device does not receive a random access response transmitted by a network device after the random access response window ends, then the terminal device needs to retransmit a random access signal; or, when the plurality of random access signals have a plurality of random access response windows, when a specific random access response window such as the first random access response window ends, and the terminal device does not receive a random access response transmitted by a network device, then the terminal device continues to retransmit a random access signal to the network device, and the first random access response window may be a random access response window corresponding to a first random access signal transmitted by the terminal device.

FIG. 3 is a schematic block diagram of an apparatus 300 for random access according to an implementation of the present disclosure, which may be the terminal device in the method 100. As shown in FIG. 3, the apparatus 300 includes a transmitting module 310, a processing module 320, and a receiving module 330.

The transmitting module 310 is used for transmitting a plurality of random access signals to a network device on a plurality of predetermined resources, wherein one predetermined resource of the plurality of predetermined resources corresponds to one random access signal of the plurality of random access signals.

The processing module 320 is used for determining a radio network temporary identifier (RNTI) according to the plurality of predetermined resources.

The receiving module 330 is used for receiving a random access response of the plurality of random access signals transmitted by the network device.

The processing module 320 is further used for detecting the random access response through the RNTI.

As an optional implementation, the processing module 320 is further used for determining the plurality of predetermined resources before the plurality of random access signals are transmitted to the network devices on the plurality of predetermined resources.

As an optional implementation, the receiving module 330 is further used for receiving first indication information transmitted by a network device, wherein the first indication information is used for indicating a plurality of predetermined resource sets, and a plurality of random access signals transmitted on a plurality of predetermined resources of each predetermined resource set in the plurality of predetermined resource sets correspond to one random access response; the processing module 320 is specifically used for determining a first predetermined resource set among the plurality of predetermined resource sets indicated by the first indication information, and determining the plurality of predetermined resources in the first predetermined set.

As an optional implementation, the first indication information is specifically used for indicating a second predetermined resource and a resource offset in each predetermined resource set of the plurality of predetermined resource sets, and the processing module 320 is specifically used for determining a second predetermined resource according to the first indication information, and determining remaining predetermined resources other than the second predetermined resource among the plurality of predetermined resources according to the second predetermined resource and the resource offset.

As an optional implementation, the resource offset includes at least one of an offset of a root sequence number, an offset of a frequency domain resource, an offset of a time domain resource, and an offset of a cyclic shift of a sequence.

As an optional implementation, the processing module 320 is further specifically used for determining the RNTI according to a first predetermined resource among the plurality of predetermined resources.

As an optional implementation, the transmitting module 310 is specifically used for successively transmitting the plurality of random access signals to the network device on the plurality of predetermined resources through a first beam.

As an optional implementation, the transmitting module 310 is further specifically used for transmitting the plurality of random access signals to the network device on the plurality of predetermined resources through a plurality of beams, and a quantity of beams of the plurality of beams is less than or equal to a quantity of random access signals of the plurality of random access signals.

As an optional implementation, the transmitting module 310 is further specifically used for sequentially and successively transmitting the plurality of random access signals to the network device on the plurality of predetermined resources through the plurality of beams.

As an optional implementation, the random access response includes second indication information, and the second indication information is used for instructing the apparatus to transmit data through a third beam among the plurality of beams, and the apparatus 300 further includes a transmission module used for transmitting data through the third beam indicated by the second indication information after the random access response of the plurality of random access signals transmitted by the network device is received.

As an optional implementation, the receiving module 330 is specifically used for receiving the random access response of the plurality of random access signals transmitted by the network device within at least one random access response window of the plurality of random access signals.

As an optional implementation, the processing module 320 is further used for stopping transmitting a subsequent random access signal to the network device if any one random access response window of the at least one random access response window does not end and the receiving module receives the random access response transmitted by the network device.

As an optional implementation, the transmitting module 310 is further used for: continuing to transmit subsequent random access signals to the network device if a first random access response window of the at least one random access response window ends and the receiving module does not receive the random access response transmitted by the network device; or continuing to transmit a subsequent random access signal to the network device if every random access response window of the at least one random access response window ends and the receiving module does not receive the random access response transmitted by the network device.

Figure 4:
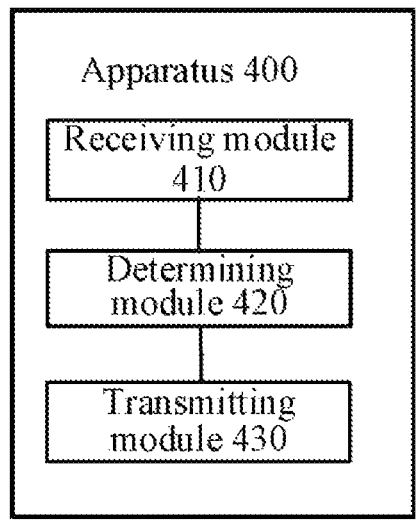
FIG. 4 is a schematic diagram of another apparatus for random access according to an implementation of the present disclosure.

FIG. 4 is a schematic block diagram of an apparatus 400 for random access according to an implementation of the present disclosure, which may be the network device in the method 200. As shown in FIG. 4, the apparatus 400 includes a receiving module 410, a determining module 420, and a transmitting module 430.

The receiving module 410 is used for receiving a plurality of random access signals on a plurality of predetermined resources, wherein one predetermined resource of the plurality of predetermined resources corresponds to one random access signal of the plurality of random access signals.

The determining module 420 is used for determining a radio network temporary identifier (RNTI) according to the plurality of predetermined resources.

The transmitting module 430 is used for transmitting a random access response of the plurality of random access signals scrambled through the RNTI.

As an optional implementation, the determining module 420 is further used for determining that the random access response of the plurality of random access signals is scrambled through the RNTI before the random access response of the plurality of random access signals scrambled through the RNTI is transmitted.

As an optional implementation, the determining module 420 is specifically used for determining the RNTI according to a first predetermined resource among the plurality of predetermined resources.

As an optional implementation, the transmitting module 430 is further used for transmitting first indication information before the plurality of random access signals are received on the plurality of predetermined resources, wherein the first indication information is used for indicating a plurality of predetermined resource sets, and a plurality of random access signals transmitted on a plurality of predetermined resources of each predetermined resource set in the plurality of predetermined resource sets correspond to one random access response, and the plurality of predetermined resource sets include a first predetermined resource set, and the first predetermined resource set includes the plurality of predetermined resources; and the receiving module 410 is specifically used for receiving the plurality of random access signals on the plurality of predetermined resources included in the first predetermined resource set.

As an optional implementation, the transmitting module 430 is specifically used for transmitting a random access response scrambled through the RNTI after the plurality of random access signals are received on all the predetermined resources included in the first predetermined resource set, wherein the all the predetermined resources include the plurality of predetermined resources.

As an optional implementation, the first indication information is specifically used for indicating a second predetermined resource and a resource offset in each predetermined resource set of the plurality of predetermined resource sets.

As an optional implementation, the resource offset includes at least one of an offset of a root sequence number, an offset of a frequency domain resource, an offset of a time domain resource, and an offset of a cyclic shift of a sequence.

As an optional implementation, the receiving module 410 is specifically used for receiving, on the plurality of predetermined resources through a plurality of beams, the plurality of random access signals transmitted on the plurality of predetermined resources through a first beam, and a quantity of beams of the plurality of beams is less than or equal to a quantity of random access signals of the plurality of random access signals.

As an optional implementation, the receiving module 410 is further specifically used for receiving, on the plurality of predetermined resources through a second beam, the plurality of random access signals transmitted sequentially and successively through a plurality of beams, and a quantity of beams of the plurality of beams is less than or equal to a quantity of random access signals of the plurality of random access signals.

As an optional implementation, the determining module 420 is further used for determining a third beam among the plurality of beams according to signal energies of the plurality of random access signals after the plurality of random access signals sequentially transmitted through the plurality of beams are received on the plurality of predetermined resources through the second beam, and the third beam is used for transmitting data; wherein the random access response includes second indication information for indicating that data is to be transmitted through the third beam.

Figure 5:
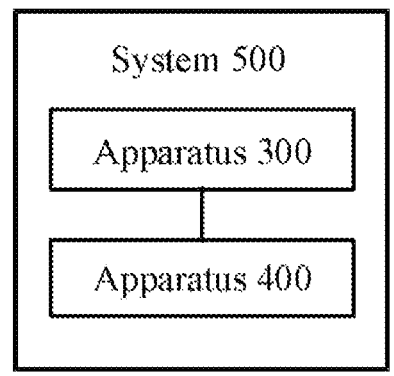
FIG. 5 is a schematic diagram of a system for random access according to an implementation of the present disclosure.

FIG. 5 shows a schematic diagram of a system 500 for random access provided by an implementation of the present disclosure, including an apparatus 300 and an apparatus 400.

Figure 6:
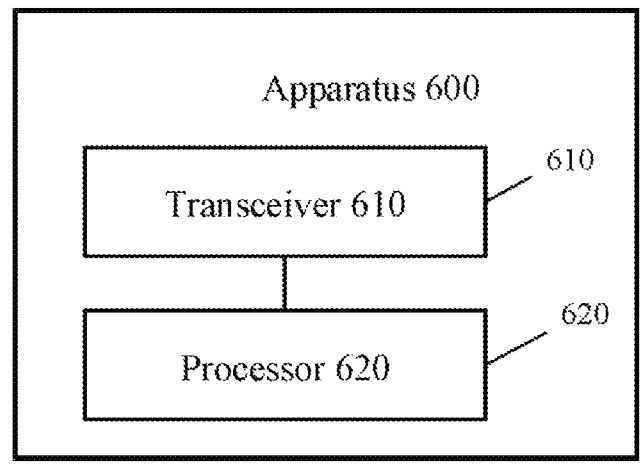
FIG. 6 is a schematic diagram of an apparatus for random access according to an implementation of the present disclosure.

FIG. 6 is a schematic block diagram of an apparatus 600 for random access according to an implementation of the present disclosure, for example, the apparatus may be the terminal device in the method 100. As illustrated in FIG. 6, the apparatus includes: a transceiver 610 and a processor 620.

The transceiver 610 is used for transmitting a plurality of random access signals to a network device on a plurality of predetermined resources, wherein one predetermined resource of the plurality of predetermined resources corresponds to one random access signal of the plurality of random access signals; the processor 620 is used for determining a radio network temporary identifier (RNTI) according to the plurality of predetermined resources; the transceiver 610 is further used for receiving a random access response of the plurality of random access signals transmitted by the network device, and the processor 620 is further used for detecting the random access response through the RNTI.

It should be understood that the apparatus 600 may correspond to the terminal device in the method 100 and may realize the corresponding functions of the terminal device in the method 100. For the sake of brevity, it will not be repeated here.

Figure 7:
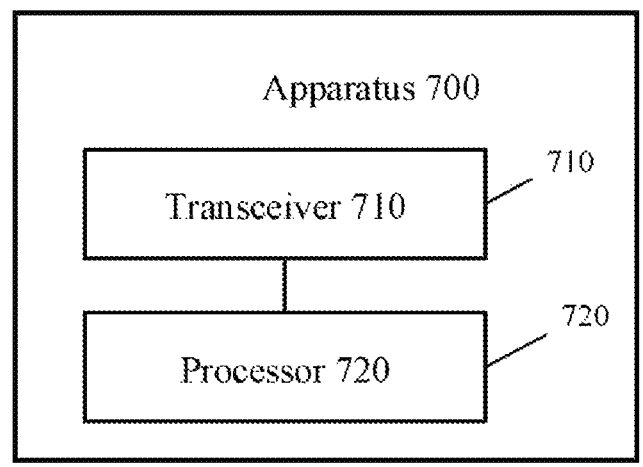
FIG. 7 is a schematic diagram of another apparatus for random access according to an implementation of the present disclosure.

FIG. 7 is a schematic block diagram for an apparatus 700 for random access according to an implementation of the present disclosure, and the apparatus may be the network device in the method 200. As illustrated in FIG. 7, the apparatus 700 includes: a transceiver 710 and a processor 720.

The transceiver 710 is used for receiving a plurality of random access signals on a plurality of predetermined resources, wherein one predetermined resource of the plurality of predetermined resources corresponds to one random access signal of the plurality of random access signals; the processor 720 is used for determining a radio network temporary identifier (RNTI) according to the plurality of predetermined resources; the transceiver 710 is further used for transmitting a random access response of the plurality of random access signals scrambled through the RNTI.

It should be understood that the apparatus 700 may correspond to the network device in the method 200, and may realize corresponding functions with the network device in the method 200. For the sake of brevity, it will not be repeated here.

It should be understood that in the implementations of the present disclosure, the processor 620 and the processor 720 may be central processing units (CPU), or other general purpose processors, digital signal processors (DSP), application specific integrated circuits (ASIC), field programmable gate arrays (FPGA) or other programmable logic devices, discrete gates or transistor logic devices, or discrete hardware components, etc. The general purpose processor may be a microprocessor, or the processor may be any conventional processor or the like.

The term "and/or" in this document is merely an association relationship describing associated objects, indicating that there may be three relationships, for example, A and/or B may indicate three situations: A alone, A and B, and B alone. In addition, the symbol "/" in this document generally indicates that objects of the former and the latter connected by "/" has an "or" relationship.

It should be understood that in various implementations of the present disclosure, values of sequence numbers of the above-mentioned processes do not indicate an order of execution, and the order of execution of various processes should be determined by their functions and internal logics, and should not constitute any limitation on the execution process of the implementations of the present disclosure.

Those of ordinary skill in the art will recognize that various exemplary units and algorithm acts described in the implementations disclosed herein may be realized in electronic hardware, or a combination of computer software and electronic hardware. Whether these functions are performed in hardware or software depends on specific applications and design constraints of technical solutions. Skilled in the art may use different methods to realize the described functions for each particular application, but such realization should not be considered to be beyond the scope of the present disclosure.

Those skilled in the art may clearly understand that for convenience and conciseness of description, the specific working process of the system, apparatus and unit described above may refer to the corresponding processes in the method implementations, and details are not described herein again.

In several implementations provided by the present disclosure, it should be understood that the disclosed system, apparatus and method may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus, or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of solutions of the implementations of the present disclosure.

In addition, various functional units in various implementations of the present disclosure may be integrated in one processing unit, or various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The storage medium includes U disk, mobile hard disk, read-only memory (ROM), random access memory (RAM), magnetic disk or optical disk, and other medium capable of storing program codes.

What are described above are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be determined by the protection scope of the claims.

What we claim is:

1. A method for random access, comprising:
receiving, by a network device, a plurality of random access signals on a plurality of predetermined resources, wherein one predetermined resource of the plurality of predetermined resources corresponds to one random access signal of the plurality of random access signals;
determining, by the network device, one radio network temporary identifier (RNTI) according to the plurality of predetermined resources, wherein there is a mapping relationship between the plurality of predetermined resources and the RNTI;
transmitting, by the network device, one random access response corresponding to the plurality of random access signals and scrambled through the RNTI; and
before the network device receives the plurality of random access signals on the plurality of predetermined resources, transmitting, by the network device, first indication information for indicating a plurality of predetermined resource sets,
wherein the first indication information is used for indicating a second predetermined resource and a resource offset in each predetermined resource set of the plurality of predetermined resource sets, to allow a terminal device to determine the second predetermined resource according to the first indication information and determine remaining predetermined resources other than the second predetermined resource among the plurality of predetermined resources according to the second predetermined resource and the resource offset.

2. The method according to claim 1, wherein the method further comprises:
before the network device transmits the random access response corresponding to the plurality of random access signals and scrambled through the RNTI, determining, by the network device, that the random access response of the plurality of random access signals is scrambled through the RNTI.

3. The method according to claim 1, wherein a plurality of random access signals transmitted on a plurality of predetermined resources of each predetermined resource set in the plurality of predetermined resource sets correspond to one random access response, the plurality of predetermined resource sets comprise a first predetermined resource set, and the first predetermined resource set comprises the plurality of predetermined resources;
wherein, receiving, by the network device, the plurality of random access signals on the plurality of predetermined resources, comprises:
receiving, by the network device, the plurality of random access signals on the plurality of predetermined resources included in the first predetermined resource set.

4. A method for random access, comprising:
transmitting, by a terminal device, a plurality of random access signals to a network device on a plurality of predetermined resources, wherein one predetermined resource of the plurality of predetermined resources corresponds to one random access signal of the plurality of random access signals;
determining, by the terminal device, one radio network temporary identifier (RNTI) according to the plurality of predetermined resources, wherein there is a mapping relationship between the plurality of predetermined resources and the RNTI;
receiving, by the terminal device, one random access response corresponding to the plurality of random access signals transmitted by the network device;
detecting, by the terminal device, the random access response through the RNTI; and
before the terminal device transmits the plurality of random access signals to the network device on the plurality of predetermined resources, determining, by the terminal device, the plurality of predetermined resources,
wherein determining, by the terminal device, the plurality of predetermined resources, comprises:
receiving, by the terminal device, first indication information transmitted by the network device, wherein the first indication information is used for indicating a plurality of predetermined resource sets, wherein the first indication information is specifically used for indicating a second predetermined resource and a resource offset in each predetermined resource set of the plurality of predetermined resource sets,
wherein determining, by the terminal device, the plurality of predetermined resources, comprises:
determining, by the terminal device, the second predetermined resource according to the first indication information; and
determining, by the terminal device, remaining predetermined resources other than the second predetermined resource among the plurality of predetermined resources according to the second predetermined resource and the resource offset.

5. The method according to claim 4, wherein a plurality of random access signals transmitted on a plurality of predetermined resources of each predetermined resource set in the plurality of predetermined resource sets correspond to one random access response; and
wherein determining, by the terminal device, the plurality of predetermined resources further comprises:

determining, by the terminal device, a first predetermined resource set among the plurality of predetermined resource sets indicated by the first indication information; and determining, by the terminal device, the plurality of predetermined resources in the first predetermined resource set.

6. The method according to claim 4, wherein receiving, by the terminal device, the random access response corresponding to the plurality of random access signals transmitted by the network device, comprises:

receiving, by the terminal device, the random access response of the plurality of random access signals transmitted by the network device within at least one random access response window of the plurality of random access signals.

7. The method according to claim 6, wherein the method further comprises:

stopping, by the terminal device, transmitting a subsequent random access signal to the network device if any one random access response window of the at least one random access response window does not end and the terminal device receives the random access response transmitted by the network device;

or, continuing, by the terminal device, to transmit a subsequent random access signal to the network device if a first random access response window of the at least one random access response window ends and the terminal device does not receive the random access response transmitted by the network device; or continuing, by the terminal device, to transmit a subsequent random access signal to the network device if each random access response window of the at least one random access response window ends and the terminal device does not receive the random access response transmitted by the network device.

8. An apparatus for random access, comprising a transceiver and a processor, wherein the transceiver is used for receiving a plurality of random access signals on a plurality of predetermined resources, wherein one predetermined resource of the plurality of predetermined resources corresponds to one random access signal of the plurality of random access signals;

wherein the processor is used for determining one radio network temporary identifier (RNTI) according to the plurality of predetermined resources, wherein there is a mapping relationship between the plurality of predetermined resources and the RNTI;

wherein the transceiver is further used for transmitting one random access response corresponding to the plurality of random access signals and scrambled through the RNTI;

wherein the transceiver is further used for transmitting first indication information before the plurality of random access signals are received on the plurality of predetermined resources, wherein the first indication information is used for indicating a plurality of predetermined resource sets; and wherein the first indication information is further used for indicating a second predetermined resource and a resource offset in each predetermined resource set of the plurality of predetermined resource sets, to allow a terminal device to determine the second predetermined resource according to the first indication information and determine remaining predetermined resources other than the second predetermined resource among the plurality of predetermined resources according to the second predetermined resource and the resource offset.

9. The apparatus according to claim 8, wherein the processor is further used for:

determining that the random access response of the plurality of random access signals is scrambled through the RNTI before the random access response corresponding to the plurality of random access signals and scrambled through the RNTI is transmitted;

or, the processor is specifically used for:

determining the RNTI according to a first predetermined resource among the plurality of predetermined resources.

10. The apparatus according to claim 8, wherein a plurality of random access signals transmitted on a plurality of predetermined resources of each predetermined resource set in the plurality of predetermined resource sets correspond to one random access response, wherein the plurality of predetermined resource sets comprise a first predetermined resource set, and the first predetermined resource set comprises the plurality of predetermined resources; and wherein the transceiver is further used for receiving the plurality of random access signals on the plurality of predetermined resources included in the first predetermined resource set.

11. The apparatus according to claim 10, wherein the transceiver is specifically used for:

transmitting a random access response scrambled through the RNTI after the plurality of random access signals are received on all predetermined resources included in the first predetermined resource set, wherein the all predetermined resources comprise the plurality of predetermined resources.

12. The apparatus according to claim 8, wherein the resource offset comprises at least one of the following:

an offset of a root sequence number, an offset of a frequency domain resource, an offset of a time domain resource, and an offset of a cyclic shift of a sequence.

13. The apparatus according to claim 8, wherein the transceiver is specifically used for:

receiving, on the plurality of predetermined resources through a plurality of beams, the plurality of random access signals transmitted on the plurality of predetermined resources through a first beam, wherein a quantity of beams of the plurality of beams is less than or equal to a quantity of random access signals of the plurality of random access signals.

14. The apparatus according to claim 8, wherein the transceiver is specifically further used for:

receiving, on the plurality of predetermined resources through a second beam, the plurality of random access signals sequentially and successively transmitted through a plurality of beams, wherein a quantity of beams of the plurality of beams is less than or equal to a quantity of random access signals of the plurality of random access signals.

15. The apparatus according to claim 14, wherein the processor is further used for:

determining a third beam among the plurality of beams according to signal energies of the plurality of random access signals after the plurality of random access signals sequentially transmitted through the plurality of beams are received on the plurality of predetermined resources through the second beam, wherein the third beam is used for transmitting data, and the random access response comprises second indication information for indicating that data is to be transmitted through the third beam.

16. An apparatus for random access, comprising a transceiver and a processor, wherein the transceiver is used for transmitting a plurality of random access signals to a network device on a plurality of predetermined resources, wherein one predetermined resource of the plurality of predetermined resources corresponds to one random access signal of the plurality of random access signals;

wherein the processor is used for determining one radio network temporary identifier (RNTI) according to the plurality of predetermined resources, wherein there is a mapping relationship between the plurality of predetermined resources and the RNTI;

wherein the transceiver is further used for receiving one random access response corresponding to the plurality of random access signals transmitted by the network device;

wherein the processor is further used for detecting the random access response through the RNTI;

wherein the processor is further used for determining the plurality of predetermined resources before the plurality of random access signals are transmitted to the network devices on the plurality of predetermined resources;

wherein the transceiver is further used for receiving first indication information transmitted by the network device, wherein the first indication information is used for indicating a plurality of predetermined resource sets, wherein the first indication information is specifically used for indicating a second predetermined resource and a resource offset in each predetermined resource set of the plurality of predetermined resource sets; and wherein the processor is further used for determining the second predetermined resource according to the first indication information and determining remaining predetermined resources other than the second predetermined resource among the plurality of predetermined resources according to the second predetermined resource and the resource offset.

17. The apparatus according to claim 16, wherein the processor is specifically further used for determining the RNTI according to a first predetermined resource among the plurality of predetermined resources.

18. The apparatus according to claim 17, wherein a plurality of random access signals transmitted on a plurality of predetermined resources of each predetermined resource set in the plurality of predetermined resource sets correspond to one random access response; and wherein the processor is specifically used for determining a first predetermined resource set among the plurality of predetermined resource sets indicated by the first indication information, and determining the plurality of predetermined resources in the first predetermined resource set.

19. The apparatus according to claim 16, wherein the resource offset comprises at least one of the following:

an offset of a root sequence number, an offset of a frequency domain resource, an offset of a time domain resource, and an offset of a cyclic shift of a sequence.

20. The apparatus according to claim 16, wherein the transceiver is specifically used for:

successively transmitting the plurality of random access signals to the network device on the plurality of predetermined resources through a first beam.

21. The apparatus according to claim 16, wherein the transceiver is specifically further used for:

transmitting the plurality of random access signals to the network device on the plurality of predetermined resources through a plurality of beams, wherein a quantity of beams of the plurality of beams is less than or equal to a quantity of random access signals of the plurality of random access signals.

22. The apparatus according to claim 21, wherein the transceiver is specifically further used for:

transmitting sequentially and successively the plurality of random access signals to the network device on the plurality of predetermined resources through the plurality of beams.

23. The apparatus according to claim 21, wherein the random access response comprises second indication information for instructing the apparatus to transmit data through a third beam among the plurality of beams, the transceiver is further used for transmitting data through the third beam indicated by the second indication information after the random access response corresponding to the plurality of random access signals transmitted by the network device is received.

24. The apparatus according to claim 16, wherein the transceiver is specifically used for:

receiving the random access response of the plurality of random access signals transmitted by the network device within at least one random access response window of the plurality of random access signals.

25. The apparatus according to claim 24, wherein the processor is further used for:

stopping transmitting a subsequent random access signal to the network device if any one random access response window of the at least one random access response window does not end and the transceiver receives the random access response transmitted by the network device.

26. The apparatus according to claim 24, wherein the transceiver is further used for:

continuing to transmit a subsequent random access signal to the network device if a first random access response window of the at least one random access response window ends and the transceiver does not receive the random access response transmitted by the network device; or continuing to transmit a subsequent random access signal to the network device if each random access response window of the at least one random access response window ends and the transceiver does not receive the random access response transmitted by the network device.

* * * * *